United States Patent
Williams

(10) Patent No.: US 11,421,587 B2
(45) Date of Patent: Aug. 23, 2022

(54) METHOD AND SYSTEM FOR DIAGNOSING AND/OR CONTROLLING A RECIPROCATING ENGINE HAVING A VARIABLE COMPRESSION RATIO

(71) Applicant: AVL LIST GMBH, Graz (AT)

(72) Inventor: Philip Williams, Hart bei Graz (AT)

(73) Assignee: AVL LIST GMBH, Graz (AT)

( * ) Notice: Subject to any disclaimer, the term of this patent is extended or adjusted under 35 U.S.C. 154(b) by 192 days.

(21) Appl. No.: 16/306,038

(22) PCT Filed: May 31, 2017

(86) PCT No.: PCT/EP2017/063116
§ 371 (c)(1),
(2) Date: Apr. 29, 2019

(87) PCT Pub. No.: WO2017/207607
PCT Pub. Date: Dec. 7, 2017

(65) Prior Publication Data
US 2019/0316517 A1     Oct. 17, 2019

(30) Foreign Application Priority Data

May 31, 2016 (AT) .............................. A 50486/2016

(51) Int. Cl.
*F02B 75/04* (2006.01)
*F02D 15/02* (2006.01)
(Continued)

(52) U.S. Cl.
CPC .............. *F02B 75/04* (2013.01); *F02D 15/02* (2013.01); *F01B 31/14* (2013.01); *F02D 15/04* (2013.01);
(Continued)

(58) Field of Classification Search
CPC ........ F02D 41/123; F02D 15/00; F02D 15/02; F02D 41/1497; F02B 75/04
(Continued)

(56) References Cited

U.S. PATENT DOCUMENTS 2,217,721 A    10/1940   Anthony
2,989,954 A     6/1961   Hulbert
(Continued)

FOREIGN PATENT DOCUMENTS

AT    512334    7/2013
AT    514071   10/2014
(Continued)

OTHER PUBLICATIONS

U.S. Appl. No. 16/306,019, filed Jul. 18, 2019, Loesch et al.
(Continued)

*Primary Examiner* — Lindsay M Low
*Assistant Examiner* — Omar Morales
(74) *Attorney, Agent, or Firm* — Sheridan Ross P.C.

(57) ABSTRACT

The invention relates to a method for diagnosing and/or controlling a reciprocating engine having a variable compression ratio, wherein the method comprises the working steps: determining (S30) a first value ($U_{1,1}$, $U_{1,2}$; $\Delta_1$) of a rotational irregularity parameter of a crankshaft (1) of the reciprocating engine; and determining (S60) a value of a compression ratio parameter for the reciprocating engine based on said first rotational irregularity parameter value.

16 Claims, 1 Drawing Sheet

(51) Int. Cl.
   *F01B 31/14* (2006.01)
   *F02D 15/04* (2006.01)
   *F16F 15/22* (2006.01)

(52) U.S. Cl.
   CPC ...... *F02D 2200/1012* (2013.01); *F16F 15/22* (2013.01)

(58) Field of Classification Search
   USPC ........................................................ 123/48 B
   See application file for complete search history.

(56) References Cited

U.S. PATENT DOCUMENTS

| | | | |
|---|---|---|---|
| 5,379,634 | A | 1/1995 | Kuroda et al. |
| 6,453,854 | B1 * | 9/2002 | Baeuerle ................ F02B 77/08 123/78 E |
| 6,536,266 | B1 | 3/2003 | Akimoto |
| 9,828,909 | B2 | 11/2017 | Paul |
| 9,964,031 | B2 | 5/2018 | Balling et al. |
| 2008/0173079 | A1 | 7/2008 | McGee et al. |
| 2008/0196697 | A1 | 8/2008 | Kein et al. |
| 2014/0174395 | A1 | 6/2014 | Richerson |
| 2014/0175940 | A1 | 6/2014 | Klostermann |
| 2015/0152794 | A1 | 6/2015 | Paul |
| 2016/0069768 | A1 | 3/2016 | Johansson et al. |
| 2016/0237889 | A1 | 8/2016 | Melde-Tuczai et al. |
| 2018/0238228 | A1 | 8/2018 | Salzgeber et al. |

FOREIGN PATENT DOCUMENTS

| | | |
|---|---|---|
| CN | 101680364 | 3/2010 |
| CN | 104043656 | 9/2014 |
| CN | 104321517 | 1/2015 |
| DE | 4026492 | 2/1992 |
| DE | 4315463 | 5/1994 |
| DE | 19757871 | 7/1999 |
| DE | 19858245 | 6/2000 |
| DE | 10201601 | 6/2003 |
| DE | 10230427 | 1/2004 |
| DE | 102004031288 | 1/2006 |
| DE | 102005024046 | 11/2006 |
| DE | 102005054627 | 5/2007 |
| DE | 102005055199 | 5/2007 |
| DE | 102006033062 | 1/2008 |
| DE | 102007040699 | 3/2009 |
| DE | 202009015316 | 2/2010 |
| DE | 102009013323 | 9/2010 |
| DE | 202012100653 | 5/2013 |
| DE | 102012212885 | 7/2013 |
| DE | 102012020999 | 1/2014 |
| DE | 102013111617 | 4/2015 |
| DE | 102014203033 | 8/2015 |
| EP | 0438121 | 7/1991 |
| EP | 1717015 | 11/2006 |
| EP | 2194244 | 6/2010 |
| JP | H05-71409 | 3/1993 |
| JP | H08-291760 | 11/1996 |
| JP | 2005-267420 | 9/2005 |
| JP | 2009-293497 | 12/2009 |
| JP | 2010-112286 | 5/2010 |
| JP | 5906589 | 4/2016 |
| KR | 20020015737 | 3/2002 |
| WO | WO 2015/055582 | 4/2015 |
| WO | WO 2016/016187 | 2/2016 |

OTHER PUBLICATIONS

International Search Report for International Patent Application No. PCT/EP2017/063116, dated Aug. 10, 2017, 2 pages.
Official Action for Austria Patent Application No. A 50486/2016, dated Jan. 20, 2017, 3 pages.
Official Action with Machine Translation for Korea Patent Application No. 10-2018-7037886, dated May 6, 2020, 10 pages.
Official Action with English Translation for Korea Patent Application No. 10-2018-7037886, dated Aug. 18, 2020, 5 pages.
Official Action with English Translation for Japan Patent Application No. 2018-562609, dated Dec. 14, 2020, 7 pages.
Official Action with machine English Translation for Japan Patent Application No. 2018-562609, dated Aug. 3, 2020, 10 pages.
Official Action with machine translation for China Patent Application No. 201780047421.1, dated Mar. 25, 2021, 12 pages.
International Search Report prepared by the European Patent Office dated Aug. 3, 2017, for International Application No. PCT/EP2017/063116.

* cited by examiner

Fig. 1
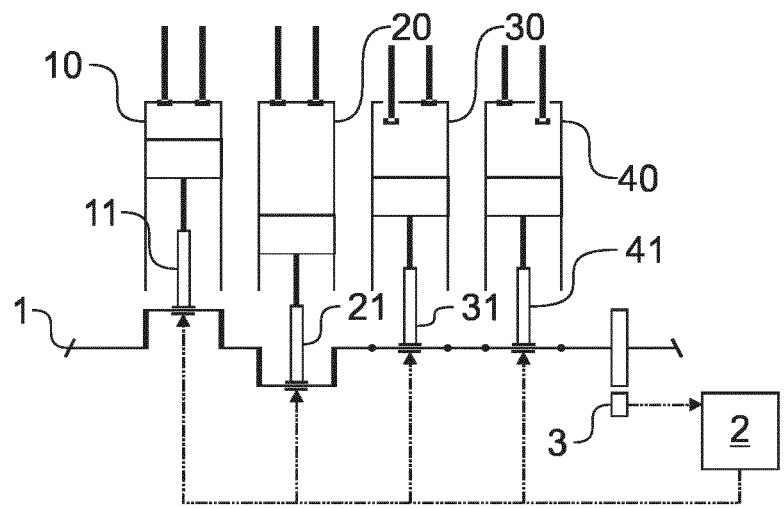
Fig. 2
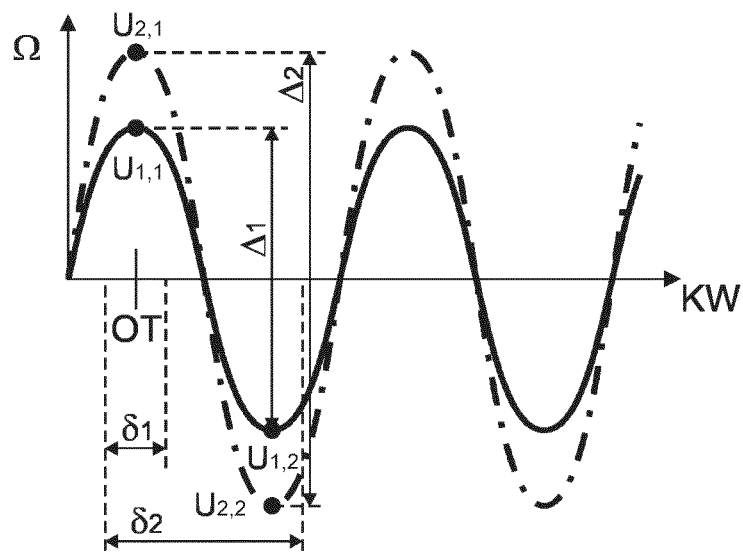
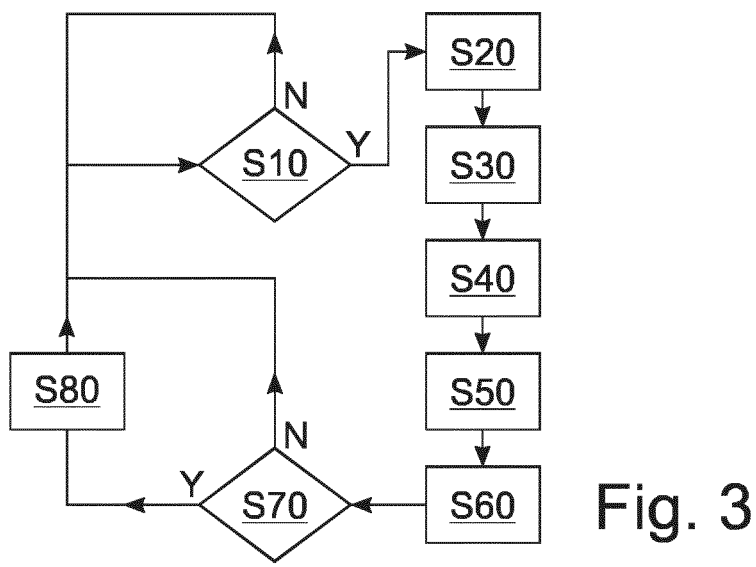
Fig. 3

METHOD AND SYSTEM FOR DIAGNOSING AND/OR CONTROLLING A RECIPROCATING ENGINE HAVING A VARIABLE COMPRESSION RATIO

CROSS REFERENCE TO RELATED APPLICATIONS

This application is a national stage application under 35 U.S.C. 371 and claims the benefit of PCT Application No. PCT/EP2017/063116 having an international filing date of 31 May 2017, which designated the United States, which PCT application claimed the benefit of Austria Patent Application No. A 50486/2016 filed 31 May 2016, the disclosure of each of which are incorporated herein by reference.

The invention relates to a method and a system for diagnosing and/or controlling a reciprocating piston engine having a variable compression ratio, as well as a motorized vehicle, in particular a motorized passenger vehicle, comprising the system.

Reciprocating piston engines having a variable compression ratio are known in the prior art, wherein the compression ratio $\varepsilon$, for the purpose of the present application, is in particular understood to be the ratio of the total of the (piston) swept volume $V_h$ and the compression volume or clearance volume $V_k$ to the compression volume or clearance volume $V_k$ alone $$\left(\varepsilon = \frac{V_h + V_k}{V_k}\right),$$

as is common in the technical field.

This enables a functionality of the reciprocating piston engines to be improved, in particular adapted to different demands.

The document WO 2015/055582 A2 proposes piston rods which are adjustable in their lengths for this purpose.

It is an object of the invention to improve a reciprocating piston engine and/or its operation.

This object is solved by means of a method or a system according to the independent claims. Claim 12 relates to a motorized vehicle with a system described herein, whereby preferred embodiments are the subject of the dependent claims. The teaching of the claims is expressly incorporated into the description.

According to one aspect of the present invention, a method of diagnosing and/or controlling a reciprocating piston engine having a variable compression ratio comprises the following process steps:
  determining a first value of a rotational irregularity parameter of a crankshaft of the reciprocating piston engine; and
  determining a value of a compression ratio parameter for the reciprocating piston engine on the basis of, or in dependence from, this first rotational irregularity parameter value.

According to an aspect of the present invention, a system for diagnosing and/or controlling an or the reciprocating piston engine having a variable compression ratio is arranged for carrying out one of the methods described herein, in particular as regards hardware and/or software aspects, in particular as regards programming aspects, and/or comprises:

means for determining an or the first value of an or the rotational irregularity parameter of an or the crankshaft of the reciprocating piston engine; and
  means for determining an or the value of an or the compression ratio parameter for the reciprocating piston engine on the basis of, or in dependence upon, this first rotational irregularity parameter value.

This is in particular based on the two findings that a compression ratio, in particular a variation of a compression ratio, influences a rotational irregularity of the reciprocating piston engine in a characteristic manner and that therefore, conversely, a compression ratio can be determined on the basis of a rotational irregularity and in particular that a change of a compression ratio can be determined on the basis of a change of a rotational irregularity, in an advantageous manner, in particular by means of measurement technology. In particular, a higher or lower compression ratio of one or more cylinders can vary dynamic forces, in particular inertia or acceleration forces, flow technology (induced) forces, in particular compression forces and/or decompression forces and/or frictional forces at its or their pistons, piston rods and such like, and thus influence a rotational irregularity in a characteristic manner, in particular a cylinder induced rotational irregularity, respectively in cylinder-specific crank angle regions, in certain ones in a significant manner.

According to an embodiment, the reciprocating piston engine is a reciprocating piston combustion engine, in particular a charged or non-charged two-stroke engine or four-stroke engine, in particular a petrol engine or a diesel engine, in particular of a motorized vehicle, in particular of a motorized passenger vehicle.

According to an embodiment, the compression ratio of one or more cylinders of the reciprocating piston engine, in particular all cylinders of the reciprocating piston engine, can be varied, in particular individually or uniformly, in particular in common, in particular reversibly, between a minimum compression ratio and a maximum compression ratio. If the compression ratios of all cylinders of the reciprocating piston engine are varied uniformly, then the cylinders induce the same (variation of the) rotational irregularity, which, according to an embodiment, improves the determination of the compression ratio parameter.

According to an embodiment, the one-dimensional or multi-dimensional rotational irregularity parameter depends on a rotational irregularity of the crank shaft, in particular at least a maximum and for a minimum rotational irregularity and/or in at least one specified crank angle region, and in a further development it quantifies this. In one embodiment, a rotational irregularity in the sense of the present invention depends on a variation of a speed of the crankshaft, in particular a rotational speed or angular speed of the crankshaft, in particular an acceleration and/or deviation from a speed reference value, in particular a speed average value, in particular a difference thereto, and/or over time and/or over a crank(shaft) angle, in particular it can specify this, in particular it can be this. According to an embodiment, the rotational irregularity is a rotational irregularity which is induced, in particular also induced, in particular at least substantially induced, by cylinders of the reciprocating piston engine or their action.

According to an embodiment, the one-dimensional or multi-dimensional compression ratio parameter depends on the compression ratio of one or several cylinders of the reciprocating piston engine, in particular of all cylinders of the reciprocating piston engine, and/or its variation, according to a further development the compression ratio parameter indicates a compression ratio of one or more cylinders of the reciprocating piston engine, in particular of all cylinders of the reciprocating piston engine, and/or its variation, in particular one or more individual compression ratios of individual cylinders and/or their variations and/or a compression ratio averaged over two or more cylinders, in particular over all cylinders, and/or its variation, a maximum and/or minimum compression ratio of two or more cylinders, in particular of all cylinders, and/or its variation or such like.

According to an embodiment, the determination of a value of the compression ratio parameter is carried out on the basis of (at least) one rotational irregularity parameter value by means of a specified association between rotational irregularity parameter values and compression ratio parameter values, in particular an empirically and/or computationally specified association, in particular by means of a simulation, in particular by means of a characteristic diagram, a functional relationship or such like.

According to an embodiment of the present invention, the method comprises the process steps of:
varying a target compression ratio of a first cylinder or several cylinders, in particular all cylinders, of the reciprocating piston engine from a first value, in particular a first extreme value, in particular a minimum or maximum value, to a second value, in particular a second extreme value, in particular a maximum or minimum value;
determining the first rotational irregularity parameter value for the first target compression ratio value, in particular at the first target compression ratio value;
determining a second value of the (same) rotational irregularity parameter for the second target compression ratio value, in particular at the second target compression ratio value; and
determining the compression ratio parameter value on the basis of the first and second rotational irregularity parameter values, in particular a deviation, in particular a difference, between the first and the second rotational irregularity parameter values.

In a corresponding manner, the system comprises, according to an embodiment:
means for varying an or the target compression ratio of a first cylinder or several cylinders, in particular all cylinders, of the reciprocating piston engine from an or the first value, in particular an or the first extreme value, in particular an or the minimum or maximum value, to an or the second value, in particular an or the second extreme value, in particular an or the maximum or minimum value;
means for determining the first rotational irregularity parameter value for the first target compression ratio value, in particular at the first target compression ratio value;
means for determining an or the second value of the (same) rotational irregularity parameter for the second target compression ratio value, in particular at the second target compression ratio value; and
means for determining the compression ratio parameter value on the basis of the first and second rotational irregularity parameter values, in particular a deviation, in particular a difference, between the first and the second rotational irregularity parameter values.

In this way, a variation or change of the compression ratio can advantageously be controlled, according to an embodiment, in particular a (mal)function of a change mechanism for changing the compression ratio can be diagnosed.

According to a further development, the changing of the target compression ratio from the first value to the second value comprises specifying the first (target) value and/or, in particular subsequently or in advance, specifying the second (target) value.

In addition or alternatively, the changing of an or the target compression ratio comprises, according to a further development, the process step of:
varying a target length of a piston rod of (at least) the first cylinder of the reciprocating piston engine, in particular of several, in particular all cylinders of the reciprocating piston engine, in particular uniformly or individually.

In a corresponding manner, the system comprises, according to an embodiment:
means for varying a target length of a piston rod of (at least) the first cylinder of the reciprocating piston engine, in particular of several, in particular all, cylinders of the reciprocating piston engine, in particular uniformly or individually.

This enables the compression ratio to be changed in an advantageous manner, according to an embodiment. In this regard, reference is made, by way of supplemental information, to the document WO 2015/055582 A2 mentioned at the beginning, and whose contents are expressly incorporated in the present disclosure by reference.

According to an embodiment of the present invention, the first and/or second rotational irregularity parameter value is/are determined for an unfired operation, in particular at an unfired operation, of a cylinder or the first cylinder or several cylinders, in particular all cylinders, of the reciprocating piston engine.

In one embodiment, this advantageously enables reference boundary conditions to be complied with. Additionally or alternatively, according to an embodiment, a disruption of an output power of the reciprocating piston engine can be reduced and preferably be avoided by varying the target compression ratio from the first to the second value during unfired operation or engine break operation of the reciprocating piston engine.

According to an embodiment of the present invention, the method comprises the process steps of:
detecting a crank angle of the crankshaft and/or at least one, in particular a first and/or higher, time derivative or variation over time of the crank angle, in particular a speed and/or acceleration of the crankshaft, in particular by means of an angle sensor and/or speed sensor and/or acceleration sensor and/or by differentiation, in particular numerical differentiation, and/or over the crank angle; and
determining the first and/or second rotational irregularity parameter value on the basis of, or in dependence upon, the detected crank angle and/or the at least one time derivative.

In an embodiment, the system comprises in a corresponding manner:
means for detecting an or the crank angle of the crankshaft and/or at least one or the, in particular a first and/or higher, time derivative of the crank angle, in particular an or the speed and/or acceleration of the crankshaft, in particular by means of an or the angle sensor and/or speed sensor and/or acceleration sensor and/or by differentiation, in particular numerical differentiation, and/or over the crank angle; and
means for determining the first and/or second rotational irregularity parameter value on the basis of, or in dependence upon, the detected crank angle and/or the at least one time derivative.

Advantageously, in an embodiment, a means, in particular a sensor, can be used for detecting a crankshaft (angle) position and/or a crankshaft (angle) speed which is already provided for other purposes and which thereby acquires a further functionality.

In an embodiment, the detected crank angle and/or the at least one time derivative is/are filtered, in particular numerically filtered, and the first and/or the second rotational irregularity parameter value is/are determined on the basis of the filtered crank angle and/or the at least one filtered time derivative. In a further development, components which are not induced by the cylinder are at least partially reduced by means of the filtering, or the detected crank angle and/or the at least one time derivative are filtered in a corresponding manner.

In a corresponding manner, in an embodiment the system comprises means for filtering the detected crank angle and/or the at least one time derivative, in particular numerically, in particular in such a way that components which are not cylinder-induced are at least partially reduced by means of the filtering, and means for determining the first and/or second rotational irregularity parameter value on the basis of the filtered crank angle and/or the at least one time derivative.

In this way, in an embodiment the quality and/or the significance of the determined rotational irregularity parameter values can be improved and/or the influence of measurement interference and/or other types of interference, in particular due to stochastic or systematic vibrations or similar, can be reduced.

According to an embodiment of the present invention, the first and/or the second rotational irregularity parameter value for one or more, or over one or more, specified crank angle regions is/are determined, or the system comprises means for determining the first and/or the second rotational irregularity parameter value for one or more, or over one or more, specified crank angle regions.

In a further development, an or the specified crank angle region comprises a top dead center and/or a bottom dead center, in particular one each, of a cylinder of the reciprocating piston engine, in particular the first cylinder of the reciprocating piston engine. In a further development, a specified crank angle region comprises a top dead center and/or a bottom dead center of the first cylinder of the reciprocating piston engine, and at least a further specified crank angle region comprises a top dead center and/or a bottom dead center of a further cylinder of the reciprocating piston engine.

In addition, or alternatively, an or the specified crank angle region extends in one embodiment over at least 2°, in particular at least 5°, in particular at least 10°, and/or at most 135°, in particular at most 90°, in particular at most 45°, in particular one each.

In one embodiment, this enables particularly characteristic rotational irregularity parameter values to be used and thus the determination of the compression ratio parameter value to be improved.

According to an embodiment of the present invention, the first and/or the second rotational irregularity parameter value is/are determined on the basis of, or in dependence upon, one or more average values and/or one or more extreme values, in particular maximum and/or minimum values, in particular of the rotational irregularity, in particular it can specify this. In a further development, the first and/or second rotational irregularity parameter value is/are determined on the basis of, or in dependence upon, at least one difference between two average values and/or extreme values, in particular maximum values and/or minimum values, in particular of the rotational irregularity, in particular it can specify this.

In one embodiment, this enables particularly characteristic rotational irregularity parameter values to be used and thus the determination of the compression ratio parameter value to be (further) improved.

According to an embodiment of the present invention, a signal, in particular a diagnostic and/or control signal, is output if the compression ratio parameter value satisfies a specified condition, in particular if the compression ratio parameter value exceeds a specified upper threshold and/or falls below a specified lower threshold and/or lies outside a specified range.

According to an embodiment, this advantageously enables a detection of a faulty compression ratio to be reacted upon.

A means in the sense of the present invention can take the form of hardware and/or software, can in particular comprise a processing unit, in particular a digital processing unit, preferably connected to a storage and/or bus system in terms of data or signals, in particular a micro processing unit (CPU), and/or can comprise one or more programs or program modules. The CPU can be configured to execute instructions, which are implemented in the form of a program stored in a storage system, to detect input signals from a data bus and/or to output output signals to a data bus. A storage system can comprise one or more storage media, in particular different storage media, in particular optical, magnetic, solid state and/or other non-volatile media. The program can be such that it can embody or execute the methods described herein, so that the CPU can execute the steps of such methods and in this way in particular control and/or monitor a reciprocating piston engine.

In the present application, the term "controlling" is in particular understood to include the outputting of control signals on the basis of a comparison with detected actual values, i.e. controlling with feedback.

According to an embodiment, one or more steps of the method, in particular all steps of the method, are carried out in a fully or partially automated manner, in particular by means of the system or its means.

Further advantageous developments of the present invention become clear from the dependent claims and the following description of preferred embodiments. The figures show, partly schematically;

FIG. 1 shows a part of a motorized vehicle according to an embodiment of the present invention;

FIG. 2 shows a rotational irregularity over a crank angle of a crankshaft of the motorized vehicle for a maximum and minimum compression ratio; and FIG. 3 shows a method of diagnosing a reciprocating piston engine of the motorized vehicle according to an embodiment of the present invention.

FIG. 1 shows a part of a motorized vehicle with a reciprocating piston combustion engine with a variable compression ratio and a system for diagnosing the reciprocating piston engine according to an embodiment of the present invention.

The reciprocating piston engine comprises, in a manner known in principle, a crankshaft 1 and several cylinders 10, 20, 30 and 40, in which pistons compress a fuel/air mixture (see cylinder 10), are driven by combustion of the mixture (see cylinder 20), take in (see cylinder 30) and exhaust (see cylinder 40) air or mixture in turn, and are coupled to the crankshaft 1 by means of piston rods 11, 21, 31 and 41 for this purpose.

The length of the piston rods 11, 21, 31, 41 and therefore the compression ratio of the cylinders 10, 20, 30 and 40 or of the reciprocating piston combustion engine is adjustable by means of an Engine Control Unit (ECU) 2, as indicated by a dash-dotted line in FIG. 1.

The ECU 2 detects a crank angle KW by means of a trigger wheel 3 and determines rotational irregularity parameter values therefrom.

FIG. 2 shows, by way of example, a rotational irregularity Ω determined by the ECU 2 for a maximum compression ratio (solid line in FIG. 2) and a minimal compression ratio (dash-dotted line in FIG. 2). The rotational irregularity Ω can for example be a variation of a crankshaft speed over crank angle $$\frac{dKW}{dt}(KW),$$

a crankshaft acceleration over crank angle $$\frac{d^2KW}{dt^2}(KW)$$

or similar.

The graphs illustrate, by way of example, that a rotational irregularity Ω of the crankshaft 1 is dependent on the current compression ratio in a characteristic manner, and in particular that it varies in a characteristic manner with the set compression ratio.

The ECU 2 carries out a method—subsequently explained in relation to FIG. 3—for diagnosing the reciprocating piston engine according to an embodiment of the present invention or is configured in terms of its hardware and software to do so.

The ECU 2 or the method checks in a step S10 whether a diagnosis condition is satisfied, in particular whether the reciprocating piston engine is in an unfired engine breaking mode or not.

In a further development, the diagnosis condition can additionally implement a cyclical operation of the method, in particular once in a specified drive cycle, for example by additionally checking a corresponding (drive) cycle indicator or flag. In a corresponding manner, the subsequent steps are carried out according to an embodiment during each engine brake operation or instead only once per drive cycle.

If the diagnosis condition is not satisfied (S10, "N"), the ECU 2 or the method repeats step S10. Otherwise, the ECU 2 or the method proceeds with step S20.

Here, the ECU 2 or the method specifies (by means of a corresponding target specification for the adjustment of the piston rod lengths) a maximum target compression ratio (of cylinders 10, 20, 30, 40) of the reciprocating piston engine, detects for or at this target compression ratio a time sequence of crank angles KW(t) and determines therefrom, using numerical filtering, the rotational irregularity Ω of the crankshaft 1 (solid line in FIG. 2).

From this, the ECU 2 or the method determines a first value of a rotational irregularity parameter in a step S30.

This can for example be a maximum value $U_{1,1}$ of the rotational irregularity Ω in a specified crank angle region $\delta_1$ around a top dead center OT of a first cylinder 10, a minimum value $U_{1,2}$ of the rotational irregularity Ω in a specified crank angle region $\delta_2$, which comprises the top dead center OT, a difference $\Delta_1$ between the maximum value and the minimum value in the specified crank angle region $\delta_2$ or such like.

In a step S40 the ECU 2 or the method specifies (by means of a corresponding target specification for the adjustment of the piston rod lengths) a minimum target compression ratio (of cylinders 10, 20, 30, 40) of the reciprocating piston engine and in turn determines, for or at this target compression ratio, the rotational irregularity Ω of the crankshaft 1 (dash-dotted line in FIG. 2) from the detected time sequence of crank angles, using numerical filtering.

From this, the ECU 2 or the method determines, in a step S50, in a manner analogous to step S30, a second value of the same rotational irregularity parameter, that is for example a maximum value $U_{2,1}$ of the rotational irregularity Ω in the specified crank angle region $\delta_1$ around a top dead center OT of a first cylinder 10, a minimum value $U_{2,2}$ of the rotational irregularity Ω in the specified crank angle region $\delta_2$ or a difference $\Delta_2$ between the maximum value and the minimum value in the specified crank angle region $\delta_2$.

In a step S60, the ECU 2 or the method then determines, on the basis of the first and second rotational irregularity parameter values, for example on the basis of a difference between the two values $(U_{2,1}-U_{1,1})$, $(U_{2,2}-U_{1,2})$ or $(\Delta_2-\Delta_1)$, a compression ratio parameter value, which is for example proportional to this difference and is dependent on a change of the compression ratio or specifies this.

In a step S70, the ECU 2 or the method checks whether this compression ratio parameter value lies outside a specified region, in particular whether it falls below a specified minimum value which is supposed to be achieved (at least) during the course of a change of the compression ratio between a maximum value and a minimum value.

If this is not the case or if the compression ratio parameter value lies within the specified region (S70; "N"), the ECU 2 or the method returns to step S10 in order to carry out the process again if the diagnosis condition is satisfied, for example in a subsequent drive cycle or during engine break operation.

Otherwise, or in the case of a deviation between the rotational irregularity parameter values for the maximum and minimum target compression ratios or their differences being too small (S70: "Y"), the ECU 2 or the method outputs a corresponding diagnosis signal in a step S80, which diagnosis signal indicates an unsatisfactory function or a malfunction of the adjustment mechanism and then returns to step S10.

Although exemplary embodiments have been discussed in the preceding description, it is noted that a variety of modifications are possible.

In this way, in the embodiment, the target lengths of all piston rods 11, 21, 31 and 41 or the target compression ratios of all cylinders 10, 20, 30 and 40 were adjusted uniformly and deviations of the rotational irregularity Ω of the crankshaft 1 resulting therefrom were taken into account only for the first cylinder 10.

In a modification, the method described above can be carried out for each of the (other) cylinders in an analogous manner, in particular their top dead centers and/or bottom dead centers can also be taken into account, and in step S80 a diagnosis signal, in particular a differentiated or individual diagnosis signal, can be output if for (at least) one of the cylinders 10, 20, 30 and 40 an unsatisfactory function or a malfunction of the corresponding piston rod 11, 21, 31 or 41 is detected, in particular the corresponding cylinder can be specified. For example, if the difference between the maximum value for the minimum and maximum compression ratio lies within the specified region for the specified crank angle region $\delta_1$ of the first cylinder 10, but not for a corresponding further specified crank angle region around the top dead center of a further cylinder 20, then a malfunction of this cylinder 20 is indicated in the step S80 according to the modification.

Insofar as the piston rods or the compression ratios are individually adjustable, it is possible, according to a variant, to change only one target length or one target compression ratio for a cylinder and to diagnose only this cylinder in steps S20, S40, wherein, in a further development of this variant, all cylinders are checked successively, that is the steps S10 to S80 can be carried out individually for all cylinders.

In a variant, for example an average value over the specified crank angle region $\delta_1$ can also be used instead of the maximum value $U_{1,1}$ or $U_{2,1}$ as rotational irregularity parameter value.

In a variant, the changing of the target length or of the target compression ratio can also be omitted. Accordingly, as in particular illustrated in FIG. 2, the presence of a maximum actual compression ratio or a compression ratio parameter value corresponding thereto can be determined from the characteristic rotational irregularity parameter values $U_{1,1}$, $U_{1,2}$ or $\Delta_1$ alone, the presence of a minimum actual compression ratio or a compression ratio parameter value corresponding to this can be determined from $U_{2,1}$, $U_{2,2}$ or $\Delta_2$ alone, and other actual compression ratios or corresponding compression ratio parameter values from intermediate values thereof.

These can additionally or alternatively be used, according to a further variant, for controlling, in particular regulating, the reciprocating piston combustion engine, in particular for the setting of the compression ratio, for example by outputting corresponding control signals in step S80.

Additionally, it is noted that the exemplary embodiments merely concern examples which are not intended to restrict the scope of protection, the applications and the structure in any way. Instead, the skilled person is being given a guideline by means of the preceding description for implementing at least one exemplary embodiment, whereby various modifications, in particular as regards the function and arrangement of the described components, can be carried out within the scope of protection as it results from the claims and combinations of features equivalent thereto.

LIST OF REFERENCE SIGNS

1 Crankshaft
2 Engine Control Unit (ECU)
3 Trigger wheel
10; 20; 30; 40 Cylinder
11; 21; 31; 41 Piston rod
KW Crank angle
$\Omega$ Filtered rotational irregularity
OT Top dead center
$\delta_1$; $\delta_2$ Specified crank angle region
$U_{1,1}$; $U_{2,1}$ Maximum value
$U_{1,2}$; $U_{2,2}$ Minimum value
$\Delta_1$; $\Delta_2$ Difference

What is claimed is:

1. A method of diagnosing or controlling a reciprocating piston engine with a variable compression ratio, comprising:
   detecting at least one of a crank angle of a crankshaft of the reciprocating piston engine and at least one time derivative of the crank angle;
   determining a first value of a rotational irregularity parameter of the crankshaft on the basis of the at least one of the detected crank angle and the at least one time derivative for a first target compression ratio of at least a first cylinder of the reciprocating piston engine,
   wherein the first value of the rotational irregularity parameter is determined for at least one specified crank angle region extending over from at least 2° to at most 135° and comprising at least one of a top dead center and a bottom dead center of the first cylinder;
   changing a target compression ratio of the first cylinder of the reciprocating piston engine from the first target compression ratio to a second target compression ratio;
   determining a second value of the rotational irregularity parameter of the crankshaft for the second target compression ratio;
   determining a value of a compression ratio parameter for the reciprocating piston engine on the basis of the first and second values of the rotational irregularity parameter; and
   outputting a signal if the value of the compression ratio parameter satisfies a specified condition.

2. The method according to claim 1, wherein changing the target compression ratio further comprises:
   changing a target length of a piston rod of the first cylinder of the reciprocating piston engine.

3. The method according to claim 1, further comprising:
   determining at least one of the first value and the second value of the rotational irregularity parameter for an unfired operation of the first cylinder of the reciprocating piston engine.

4. The method according to claim 1, wherein the least one specified crank angle region extends over from at least 10° to at most 45°.

5. The method according to claim 1, further comprising:
   filtering at least one of the detected crank angle and the at least one time derivative of the crank angle; and
   determining the first value or the second value of the rotational irregularity parameter on the basis of the filtered crank angle or the at least one filtered time derivative.

6. The method according to claim 1, wherein at least one of the first value and the second value of the rotational irregularity parameter is determined on the basis of at least one average value or at least one extreme value.

7. A system for diagnosing or controlling a reciprocating piston engine with a variable compression ratio, comprising:
   a sensor for detecting at least one of a crank angle of a crankshaft of the reciprocating piston engine and at least one time derivative of the crank angle; and
   an engine control unit for:
      determining a first value of a rotational irregularity parameter of the crankshaft on the basis of the at least one of the detected crank angle and the at least one time derivative for a first target compression ratio of at least a first cylinder of the reciprocating piston engine,
      wherein the first value of the rotational irregularity parameter is determined for at least one specified crank angle region extending over from at least 2° to at most 135° and comprising at least one of a top dead center and a bottom dead center of the first cylinder;
      changing a target compression ratio of the first cylinder of the reciprocating piston engine from the first target compression ratio to a second target compression ratio;

determining a second value of the rotational irregularity parameter of the crankshaft for the second target compression ratio;

determining a value of a compression ratio parameter for the reciprocating piston engine on the basis of the first and second values of the rotational irregularity parameter; and outputting a signal if the value of the compression ratio parameter satisfies a specified condition.

8. The system according to claim 7, wherein the least one specified crank angle region extends over from at least 10° to at most 45°.

9. The system according to claim 7, wherein changing the target compression ratio further comprises:

changing a target length of a piston rod of the first cylinder of the reciprocating piston engine.

10. The system according to claim 7, wherein the engine control unit is further operable to:

determine at least one of the first value and the second value of the rotational irregularity parameter for an unfired operation of the first cylinder of the reciprocating piston engine.

11. The system according to claim 7, wherein at least one of the first value and the second value of the rotational irregularity parameter is determined on the basis of at least one average value or at least one extreme value.

12. A motorized vehicle, comprising:

a reciprocating piston engine with a variable compression ratio that includes a first cylinder coupled to a crankshaft by a piston rod having an adjustable length; and a system for controlling the reciprocating piston engine which includes:

a sensor for detecting at least one of a crank angle of the crankshaft and at least one time derivative of the crank angle; and an engine control unit for:

determining a first value of a rotational irregularity parameter of the crankshaft on the basis of the at least one of the detected crank angle and the at least one time derivative for a first target compression ratio of at least the first cylinder of the reciprocating piston engine, wherein the first value of the rotational irregularity parameter is determined for at least one specified crank angle region extending over from at least 2° to at most 135° and comprising at least one of a top dead center and a bottom dead center of the first cylinder;

changing a target compression ratio of the first cylinder of the reciprocating piston engine from the first target compression ratio to a second target compression ratio;

determining a second value of the rotational irregularity parameter of the crankshaft for the second target compression ratio;

determining a value of a compression ratio parameter for the reciprocating piston engine on the basis of the first and second values of the rotational irregularity parameter; and outputting a signal if the value of the compression ratio parameter satisfies a specified condition.

13. The motorized vehicle according to claim 12, wherein the least one specified crank angle region extends over from at least 10° to at most 45°.

14. The motorized vehicle according to claim 12, wherein changing the target compression ratio further comprises:

changing a target length of the piston rod of the first cylinder of the reciprocating piston engine.

15. The motorized vehicle according to claim 12, wherein the engine control unit is further operable to:

determine at least one of the first value and the second value of the rotational irregularity parameter for an unfired operation of the first cylinder of the reciprocating piston engine.

16. The motorized vehicle according to claim 12, wherein at least one of the first value and the second value of the rotational irregularity parameter is determined on the basis of at least one average value or at least one extreme value.

* * * * *